(12) United States Patent
Tin

(10) Patent No.: US 8,520,020 B2
(45) Date of Patent: Aug. 27, 2013

(54) STEREOSCOPIC COLOR MANAGEMENT

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 12/637,615

(22) Filed: Dec. 14, 2009

(65) Prior Publication Data

US 2011/0141104 A1    Jun. 16, 2011

(51) Int. Cl.
G09G 5/00 (2006.01)
G09G 5/02 (2006.01)
G09G 1/28 (2006.01)
G09G 5/36 (2006.01)
H04N 15/00 (2006.01)
H04N 5/202 (2006.01)
H04N 5/46 (2006.01)
G03F 3/08 (2006.01)
G03B 21/60 (2006.01)
G02B 27/22 (2006.01)
G06K 9/40 (2006.01)
G06K 9/00 (2006.01)

(52) U.S. Cl.
USPC ........... 345/586; 345/591; 345/604; 345/549; 345/690; 345/22; 348/42; 348/51; 348/254; 348/557; 348/564; 349/15; 353/7; 358/518; 358/523; 359/458; 359/466; 382/154; 382/167; 382/254; 382/274; 382/162

(58) Field of Classification Search
USPC .............. 345/581, 589–591, 593, 600–604, 345/619–620, 664, 548–549, 555, 690, 22; 348/42, 47, 51–52, 254, 552–553, 557–558, 348/563–564, 588; 349/15; 353/6–7, 30–31, 353/34; 359/458, 462, 464, 466, 725; 358/518–520, 523–525, 448, 452–453; 382/154, 162–167, 254, 274, 276, 302

See application file for complete search history.

(56) References Cited

U.S. PATENT DOCUMENTS

| | | | |
|---|---|---|---|
| 5,481,380 A | 1/1996 | Bestmann | 358/504 |
| 6,307,585 B1 * | 10/2001 | Hentschke | 348/51 |
| 6,584,219 B1 | 6/2003 | Yamashita et al. | 382/154 |
| 2004/0247175 A1 * | 12/2004 | Takano et al. | 382/154 |
| 2006/0209183 A1 * | 9/2006 | Mashitani et al. | 348/51 |
| 2007/0183650 A1 | 8/2007 | Lipton et al. | 382/154 |
| 2007/0296721 A1 * | 12/2007 | Chang et al. | 345/427 |

(Continued)

OTHER PUBLICATIONS

International Search Report and Written Opinion dated Feb. 23, 2011 in counterpart PCT/US2010/060118.

*Primary Examiner* — Wesner Sajous
(74) *Attorney, Agent, or Firm* — Fitzpatrick, Cella, Harper & Scinto

(57) ABSTRACT

Stereoscopic color management of images with plural views. Image data for each view is defined in a component input device color space. Image data in the component input device color spaces is converted to a nominal source color space using plural input transforms each corresponding to one of the plural views. A rendering transform is used to convert image data for each view in the nominal source color space to a nominal destination color space. The nominal source color space, nominal destination color space and rendering transform are the same for all views. The image data for each view in the nominal destination color space is ultimately converted to a component output device color space associated with a stereoscopic output device respective of the view using a respective output transform.

68 Claims, 11 Drawing Sheets

(56) References Cited

U.S. PATENT DOCUMENTS

| | | |
|---|---|---|
| 2008/0198920 A1 | 8/2008 | Yang et al. |
| 2008/0246717 A1* | 10/2008 | Miyake et al. .................. 345/92 |
| 2008/0247670 A1* | 10/2008 | Tam et al. ..................... 382/298 |
| 2008/0252638 A1* | 10/2008 | Riemens et al. .............. 345/419 |
| 2009/0015662 A1* | 1/2009 | Kim et al. ....................... 348/43 |
| 2009/0189974 A1* | 7/2009 | Deering .......................... 348/46 |
| 2009/0219385 A1 | 9/2009 | Lester et al. .................... 348/51 |
| 2009/0278936 A1* | 11/2009 | Pastoor et al. ................ 348/169 |
| 2009/0315982 A1* | 12/2009 | Schmidt et al. ................. 348/47 |
| 2010/0033554 A1* | 2/2010 | Kobayashi ....................... 348/43 |
| 2010/0054580 A1* | 3/2010 | Miyoshi et al. ............... 382/154 |
| 2010/0080448 A1* | 4/2010 | Tam et al. ..................... 382/154 |
| 2010/0171817 A1* | 7/2010 | Tourapis et al. ................ 348/51 |
| 2011/0064944 A1* | 3/2011 | Tew et al. ..................... 428/339 |

\* cited by examiner

STEREOSCOPIC COLOR MANAGEMENT

FIELD

The present disclosure relates to stereoscopic color management, and more particularly relates to color management of stereoscopic images.

BACKGROUND

In the field of this disclosure, stereoscopic (commonly called "3-D") images are captured and displayed. Stereoscopic image capture typically involves capturing a scene at multiple viewing points separated by a distance comparable to the interocular distance in order to produce multiple "views" of the same scene. Stereoscopic image display typically involves displaying the multiple views on a 2-dimensional display with an additional optical and/or occlusion layer in such a way that each view can only be seen from a certain viewing point, thus giving the illusion of "depth" by way of "stereo parallax" and/or "movement parallax". Stereoscopic imaging has many practical applications, including, for example, medical imaging, scientific visualization, virtual prototyping, and last but not the least, entertainment applications such as games and movies.

Creation of stereoscopic images typically involves imagers capable of capturing two or more views of a scene. For example, two cameras may be set up in a "camera rig" with an interaxial distance adjusted to the interocular distance, which typically averages 65 mm.

The "stereoscopic pair" thus obtained, consisting of left and right images, needs to be displayed appropriately. In 3-D cinema, the left and right images are projected onto a silver screen with orthogonally distinct polarization filters and viewed with passive polarizing glasses. For use in homes, more suitable display technologies include displays specially coated with a layer of "micro-polarizer", in which the left and right images are spatially encoded in predetermined patterns. In this case, passive polarizing glasses are needed for viewing. Another class of display technologies uses a "page flipping" technique in which the left and right images are alternatively displayed at a high frequency, typically 120 Hz or higher. In this case, active shutter glasses are needed for viewing.

It is also possible to construct 3-D displays that do not require glasses. Such displays, called autostereoscopic displays, may be more preferable to some users. Technologies used in the construction of autostereoscopic displays include the use of a lenticular sheet, and parallax barrier, among others.

It is well known that color management is critical in content production. In movie and television post-production, for example, color decisions are made by the director and/or cinematographer based on a creative vision. Color management is used to ensure that this vision is preserved through the post-production workflow and through the various exhibition and release channels.

SUMMARY

The inventor herein has identified a need to extend existing monoscopic (i.e., "2-D") color management techniques to stereoscopic imagery in order to maintain color consistency across multiple stereoscopic devices.

Additionally, the inventor herein has identified a need to minimize color discrepancy among the multiple views of a stereoscopic image, and has observed that such color discrepancy may lead to viewing fatigue, or in the worst case, difficulty to combine the left and right views into a coherent image. The inventor has noted that while a common solution on the capture side is to arrange such that the imagers used to capture the multiple views are "identical", this requires stricter quality control and incurs additional cost in the manufacturing process. A similar issue exists in order to maintain consistency among multiple views on a display in the manufacturing process.

The foregoing situation is addressed through the provision of stereoscopic color management that can correct the discrepancy among multiple views of stereoscopic devices. Such stereoscopic color management converts multiple views of a stereoscopic input device, each of which is in its own component input device color space, into a common nominal source color space, uses a common rendering transform to convert the nominal source color space to a common nominal destination color space, and converts the multiple views in the common nominal destination color space to their respective component output device color space of a stereoscopic output device.

Thus, in an example embodiment described herein, image data for plural views of a scene is accessed. The image data is captured by a stereoscopic input device, and the image data for each view is defined in a corresponding component input device color space. The image data in the component input device color spaces is converted to a nominal source color space using plural input transforms each corresponding to one of the plural views. Each input transform converts from a respective component input device color space to the same nominal source color space. A rendering transform is used to convert image data for each view in the nominal source color space to a nominal destination color space. The nominal source color space, nominal destination color space and rendering transform are the same for all views. The image data for each view in the nominal destination color space is converted to a respective one of plural component output device color spaces using a respective one of plural output transforms. The plural component output device color spaces are associated with a stereoscopic output device and each component output device color space corresponds to one of the plural views. Each output transform converts from the nominal destination color space to a respective destination device color space corresponding to a respective view.

In one advantage, because stereoscopic color management is provided for image data for plural views of a scene, color reproduction, such as color consistency, of stereoscopic images may be improved.

In another advantage, because of the use of a nominal source color space common among all views, wherein each component input device color space is converted to the nominal source color space before the common rendering transform is applied, it is not ordinarily necessary for the component input device color spaces of the stereoscopic input device to be the same.

In another advantage, because of the use of a nominal destination color space common among all views, which the common rendering transform renders to, color discrepancy among the plural views may be reduced.

There can be image data for two views for each scene. The stereoscopic input device can comprise plural monoscopic input devices. Each monoscopic input device can correspond to one of the plural views and the respective component input device color space. Each one of the plural input transforms can be defined by a respective one of the monoscopic input devices. Each monoscopic input device can be a camera, and the nominal source color space can be an RGB space of a predetermined one of the cameras.

In an example embodiment also described herein, the nominal source color space can be a virtual device color space.

The stereoscopic output device can comprise plural monoscopic output devices, each monoscopic output device corresponding to one of the plural views and the respective component output device color space. Each one of the plural output transforms can be defined by a respective one of the monoscopic output devices. The stereoscopic output device can be a stereoscopic display.

In an example embodiment also described herein, the stereoscopic output device can be an autostereoscopic display.

The image data can include still images. It can also include moving images. The rendering transform can comprise a first transform from the nominal source color space to a profile connection space, and a second transform from the profile connection space to the nominal destination color space. The first and second transforms can each implement a rendering intent.

At least one of the input transforms, the output transforms, and the rendering transform can be defined by LUT-based profiles. In an example embodiment also described herein, at least one of the input transforms, the output transforms, and the rendering transform can be defined by transform language based profiles. In an example embodiment also described herein, at least one of the input transforms, the output transforms, and the rendering transform can be defined by measurement-based profiles.

This brief summary has been provided so that the nature of this disclosure may be understood quickly. A more complete understanding can be obtained by reference to the following detailed description and to the attached drawings.

DETAILED DESCRIPTION

Figure 1:
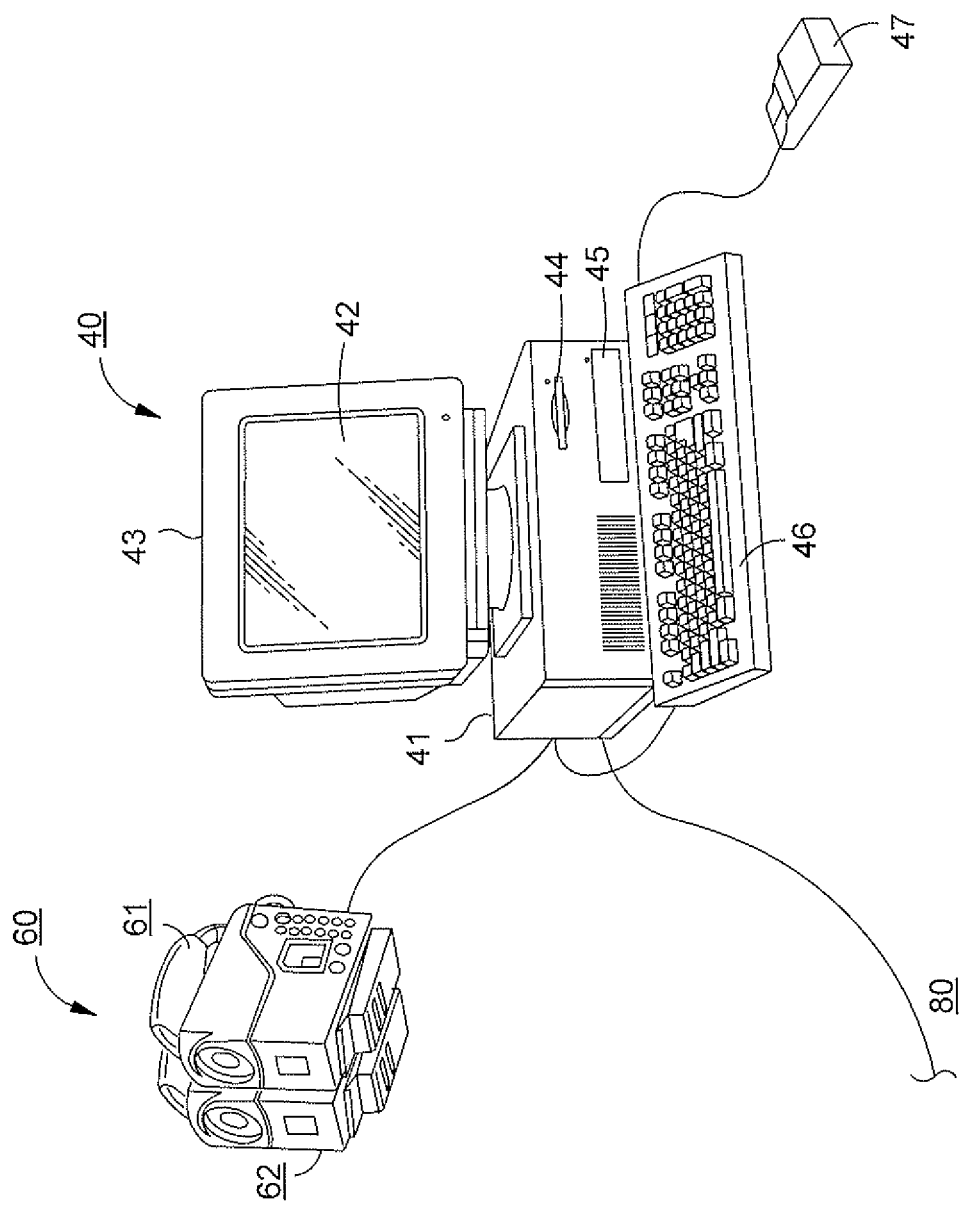
FIG. 1 is a representative view of computing equipment relevant to one example embodiment.

FIG. 1 is a representative view of computing equipment, peripherals and digital devices, relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes stereoscopic color monitor 43 including stereoscopic display screen 42, keyboard 46 for entering text data and user commands, and pointing device 47. Pointing device 47 preferably comprises a mouse for pointing and for manipulating objects displayed on stereoscopic display screen 42.

Stereoscopic color monitor 43 is a stereoscopic output device. In the example embodiment, display screen 42 of stereoscopic color monitor 43 is a stereoscopic display. In the example embodiment, display screen 42 is a stereoscopic display that requires special eyewear for viewing. In another example embodiment, the display screen is a stereoscopic display that does not require special eyewear for viewing, such as, for example, an autostereoscopic display.

Host computer 41 also includes computer-readable memory media such as computer hard disk 45 and DVD disc drive 44, which are constructed to store computer-readable information such as computer-executable process steps. DVD disc drive 44 provides a means whereby host computer 41 can access information, such as image data, computer-executable process steps, application programs, etc. stored on removable memory media. In an alternative, information can also be retrieved through other computer-readable media such as a USB storage device connected to a USB port (not shown), or through network interface 80. Other devices for accessing information stored on removable or remote media may also be provided.

Stereoscopic digital color camera 60 is an example of a stereoscopic input device, and is provided for sending digital image data to host computer 41. In the example embodiment, the image data can be either still image data or moving image data. In the example embodiment, stereoscopic digital color camera 60 includes two monoscopic imagers 61 and 62 set up with an interaxial distance adjusted appropriately to emulate the interocular distance. In other embodiments, stereoscopic digital color camera 60 can include a single device that generates an image for each view of a stereoscopic image. In another example embodiment, stop motion image capture is used in conjunction with a monoscopic input device to capture multiple views, and the interocular distance is simulated by moving the monoscopic input device horizontally (using for example, a robot).

Of course, host computer 41 may acquire stereoscopic digital image data from other sources such as a stereoscopic digital still camera, a local area network or the Internet via network interface 80. Likewise, host computer 41 may interface with other stereoscopic color output devices, such as stereoscopic color output devices accessible over network interface 80.

Figure 2:
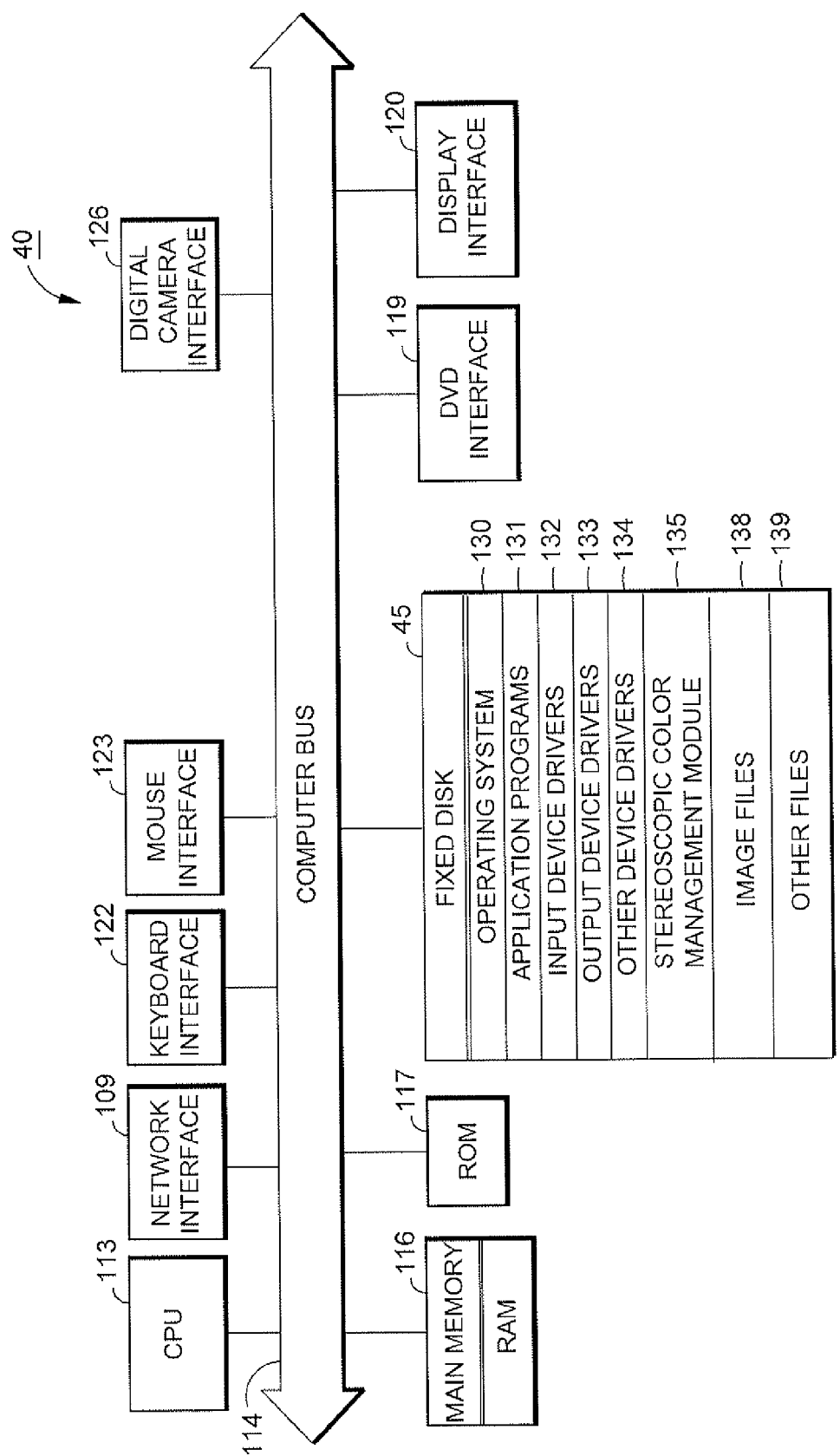
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 113 which interfaces with computer bus 114. Also interfacing with computer bus 114 are hard disk 45, network interface 109, random access memory (RAM) 116 for use as a main run-time transient memory, read only memory (ROM) 117, DVD disc interface 119, display interface 120 for stereoscopic color monitor 43, keyboard interface 122 for keyboard 46, mouse interface 123 for pointing device 47, and digital camera interface 126 for stereoscopic digital camera 60.

RAM 116 interfaces with computer bus 114 so as to provide information stored in RAM 116 to CPU 113 during execution of the instructions in software programs such as an operating system, application programs, stereoscopic color management modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, hard disk 45 contains computer-executable process steps for operating system 130, and application programs 131, such as word processing programs or graphic image management programs. Hard disk 45 also contains computer-executable process steps for device drivers for software interface to devices, such as input device drivers 132, output device drivers 133, and other device drivers 134. Image files 138, including stereoscopic color image files, and other files 139 are available for output to stereoscopic color output devices and for manipulation by application programs.

Stereoscopic color management module (SCMM) 135 comprises computer-executable process steps executed by a computer for managing colors so as to maintain good color fidelity for stereoscopic color images that are transferred from a stereoscopic source device to a stereoscopic destination device, such as the transfer of color image data from capture by stereoscopic digital camera 60 to display by stereoscopic display 42. SCMM 135 generally comprises computer-executable process steps that accept a stereoscopic source color image having colors with colorant values in a source device dependent color system, and that generate a destination color image having colors with counterpart colorant values in a destination device dependent color space. More specifically, SCMM 135 accesses image data for plural views of a scene. The image data is captured by stereoscopic input device 60, and the image data for each view is defined in a corresponding component input device color space. The image data in the component input device color spaces is converted to a nominal source color space using plural input transforms each corresponding to one of the plural views. Each input transform converts from a respective component input device color space to the same nominal source color space. A rendering transform is used to convert image data for each view in the nominal source color space to a nominal destination color space. The nominal source color space, nominal destination color space, and rendering transform are the same for all views. The image data for each view in the nominal destination color space is converted to a respective one of plural component output device color spaces using a respective one of plural output transforms. The plural component output device color spaces are associated with stereoscopic color monitor 43 and correspond each to one of the plural views. Each output transform converts from the nominal destination color space to a respective destination device color space corresponding to a respective view.

The computer-executable process steps for SCMM 135 may be configured as part of operating system 130, as part of an output device driver such as a display driver, or as a stand-alone application program such as a stereoscopic color management system or a color grading system. They may also be configured as a plug-in or dynamic link library (DLL) to the operating system, device driver or application program. For example, SCMM 135 according to example embodiments may be incorporated in an output device driver for execution in a computing device, such as a display driver, embedded in the firmware of an output device, such as a display, or provided in a stand-alone color management application for use on a general purpose computer. In one example embodiment described herein, SCMM 135 is incorporated directly into the operating system for general purpose host computer 41. It can be appreciated that the present disclosure is not limited to these embodiments and that the disclosed color management module may be used in other environments in which color management is used.

Figure 3:
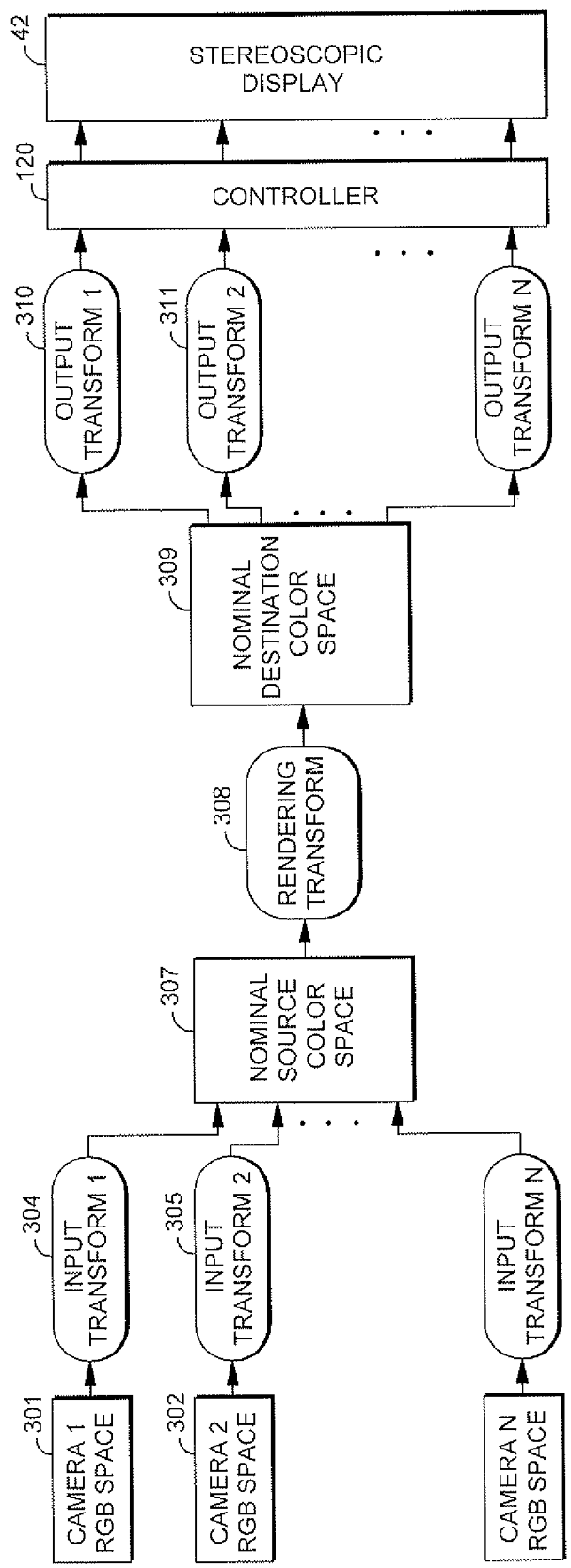
FIG. 3 is a representational view of stereoscopic color transform processing performed by a Stereoscopic Color Management Module, according to an example embodiment.

FIG. 3 is a representational view of stereoscopic color transform processing performed by SCMM 135. As shown in FIG. 3, input device color spaces 301 and 302 are the color spaces of the two imagers included in stereoscopic digital color camera 60. In the example embodiment, each imager is an internal component, such as an optical component, of stereoscopic digital color camera 60. In other example embodiments, each imager can be a self-contained unit, such as, for example, an independently functioning monoscopic digital color camera. Input device color space 301 corresponds to imager 61, and input device color space 302 corresponds to imager 62. In other embodiments in which the stereoscopic input device includes more than two imagers (e.g., more than two monoscopic input devices) additional input device color spaces (and corresponding additional output device color spaces) will be included in the stereoscopic color management workflow.

In the example embodiment, each input device color space 301 and 302 are RGB color spaces, but in other embodiments, input device color spaces 301 and 302 can be any other suitable type of input device color space, such as, for example, the $YC_bC_r$ space. In the example embodiment, each input device color space 301 and 302 is a 3-channel color space, but in other embodiments, input device color spaces 301 and 302 can have more than three channels, such as in the case of a multi-spectral input device color space.

In the example embodiment, nominal source color space 307 is the input device color space of one of the two imagers included in stereoscopic digital color camera 60 (e.g., color space 301 of imager 61).

In the case where a monoscopic input device is used in conjunction with the stereoscopic color management workflow depicted in FIG. 3, the nominal source color space is the color space of the monoscopic input device. Similarly, in the case where a monoscopic output device is used, the nominal destination color space is the color space of the monoscopic output device. In this manner, SCMM 135 provides color processing for both monoscopic and stereoscopic images.

In an example embodiment in which stop motion image capture is used in conjunction with a monoscopic input device to capture multiple views, the nominal source color space is the color space of the monoscopic input device.

In other example embodiments, the nominal source color space is a virtual device color space. In other words, the nominal source color space can be a color space that is not associated with a real device. Examples of virtual device color spaces include sRGB color space and ACES RGB space. The virtual device color space can also be a custom color space, such as, for example, a virtual RGB device color space optimized to allow interchange of device values of each monoscopic input device.

Each input device color space 301 and 302 corresponds to a view, and is related to the nominal source color space 307 by a respective input transform (e.g., 304 and 305). In the example embodiment, input transform 304 relates the device values of color space 301 (of imager 61) to nominal source color space 307, and input transform 305 relates the device values of color space 302 (of imager 62) to nominal source color space 307.

Similarly, each output transform 310 and 311 relates nominal destination color space 309 to each view of stereoscopic display 42.

In the example embodiment, the nominal destination color space is a color space that is determined to be suitable for representing the outputs of the rendering transform. In the example embodiment, the nominal destination color space is the CIEXYZ color space, but in other embodiments, the nominal destination color space can be any other color space that is suitable for representing the outputs of the rendering transform.

Rendering transform 308 converts color values in nominal source color space 307 to color values in nominal source color space 309. Rendering transform 308 can be any suitable type of rendering transform.

In operation, SCMM 135 accesses image data for plural views of a scene. The image data is captured by imagers 61 and 62. The image data for the view captured by imager 61 is defined in input device color space 301, and image data for the view captured by imager 62 is defined in input device color space 302. The image data in input device color space 301 is converted to nominal source color space 307 by input transform 304, and the image data in input device color space 302 is converted to nominal source color space 307 by input transform 305. Thus, each input transform converts from a respective input device color space to the same nominal source color space 307.

Rendering transform 308 is used to convert image data for each view in the nominal source color space 307 to nominal destination color space 309. Nominal source color space 307, nominal destination color space 309 and rendering transform 308 are the same for all views. The image data in nominal destination color space 309 corresponding to the view captured by imager 61 is converted to a respective output device color space using output transform 310. The image data in nominal destination color space 309 corresponding to the view captured by imager 62 is converted to a respective output device color space using output transform 311. The plural output device color spaces (not shown) are associated with stereoscopic output device 42 and correspond each to one of the plural views. The data in the output device color spaces is received by display interface 120. Each output transform 310 and 311 converts from nominal destination color space 309 to a respective destination device color space corresponding to a respective view.

The nominal source color space and the nominal destination color space provide compatibility with monoscopic input and output devices. This compatibility is provided by taking the nominal source color space as the color space of the monoscopic input device, the nominal destination color space as the color space of the monoscopic output device, and by using the identity transform as both the respective input transform and output transform.

The use of a nominal source color space and a nominal destination color space that are common among all views allows the use of a single rendering transform between the nominal source color space and the nominal destination color space. This provides the same rendering for each view.

Figure 4:
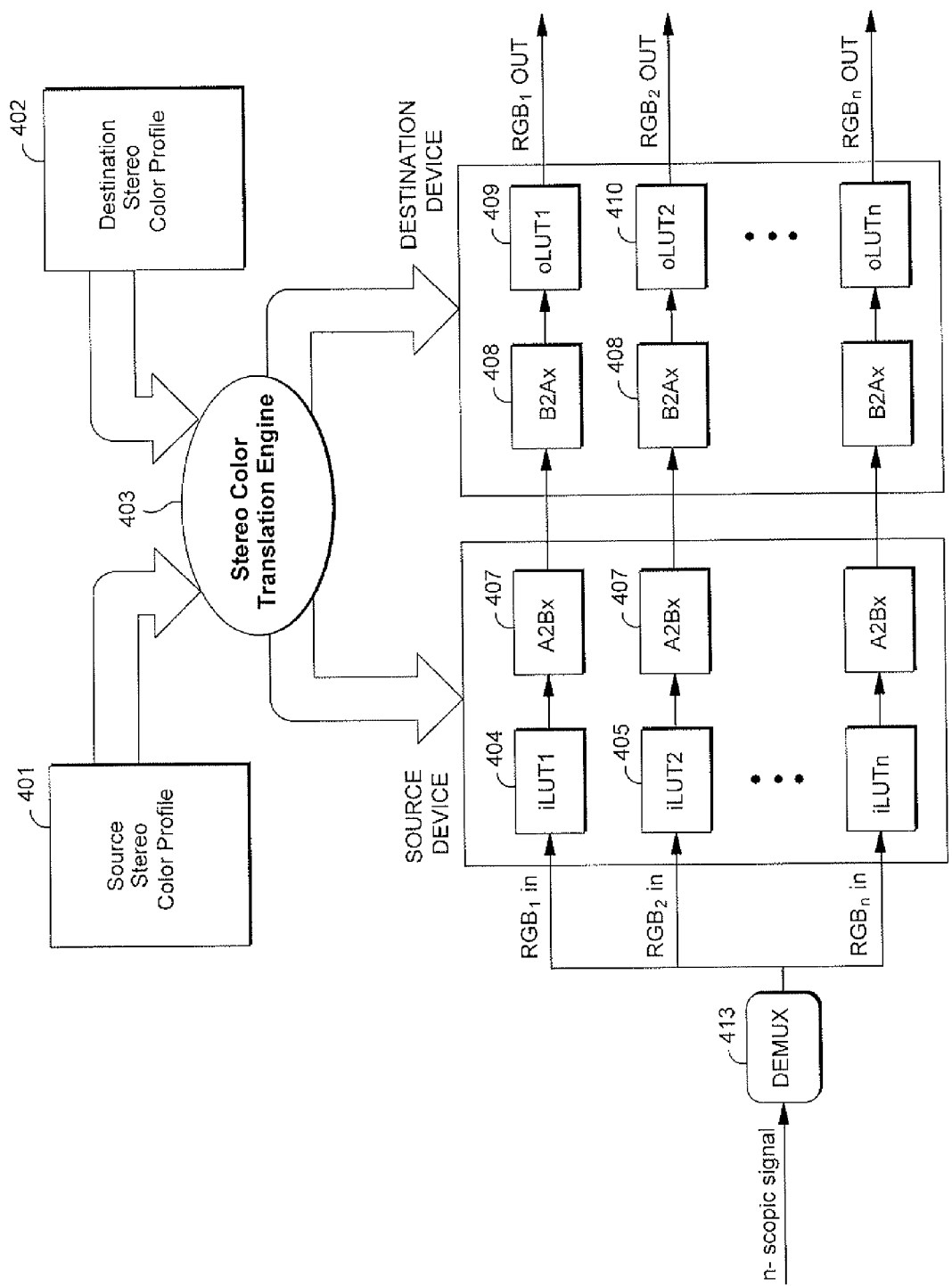
FIG. 4 is a representational view of stereoscopic color transform processing performed by a Stereoscopic Color Management Module in which the input transforms, the output transforms, and the rendering transform are defined by LUT-based profiles, according to an example embodiment.

FIG. 4 is a representational view of stereoscopic color transform processing performed by a Stereoscopic Color Management Module (SCMM), in which the input transforms, the output transforms, and the rendering transform are defined by LUT-based profiles. As shown in FIG. 4, the stereoscopic image includes multiple views that are multiplexed in a known format, such as, for example, a temporal multiplexing format. Demultiplexer 413 decodes the multiplexed stereoscopic image stream from, for example, an image file (e.g., 138 of FIG. 2) to generate separate image data streams for each view. In the example embodiment, each view corresponds to an RGB input device color space. For purposes of illustration, FIG. 4 depicts transforms to process n such multiple views, where n can be 1, 2, 3, and so on.

Rendering transform 407 converts image data from the nominal source color space to a profile connection space, and rendering transform 408 converts image data from the profile connection space to the nominal destination color space. In the example embodiment, the nominal source color space, the nominal destination color space and the profile connection space each have 3 color channels, and rendering transforms 407 and 408 are each defined by a look-up table (LUT) having 3 input channels and 3 output channels. In the example embodiment, each rendering transform LUT includes $n^3 \cdot 3$ entries, where n is the number of steps for each input dimension. In the example embodiment, the number of steps for each input dimension are the same for each rendering transform LUT. However, in other embodiments, the number of steps for each input dimension can be different for each rendering transform LUT. In the example embodiment, each entry is an 8-bit integer, but in other embodiments, each entry can be any other suitable data type, such as, for example, a 16-bit integer, a 16-bit half-precision floating point number, a 32-bit single precision floating point number, a 64-bit double precision floating point number, or the like.

In the example embodiment, the profile connection space is the CIELAB color space, but in other embodiments, the profile connection space can be any other suitable profile connection space, such as, for example, the ACES (Academy Color Encoding Specification) RGB space.

Rendering transforms 407 and 408 each implement a rendering intent. In the example embodiment, the rendering intent is one of a perceptual intent, a colorimetric intent, and a saturation intent. Together, rendering transforms 407 and 408 form a rendering transform from the nominal source color space to the nominal destination color space. Thus, together, rendering transforms 407 and 408 form a rendering transform that is similar to rendering transform 308 of FIG. 3.

Input transforms 404 and 405 are similar to input transforms 304 and 305 of FIG. 3. Output transforms 409 and 410 are similar to input transforms 310 and 311 of FIG. 3.

In the example embodiment, since each view corresponds to an RGB input device color space having 3 channels and an RGB output device color space having 3 channels, and the nominal source and destination color spaces are also 3-dimensional, the input transforms and output transforms are defined by LUTs having 3 input channels and 3 output channels. In the example embodiment, each input and output LUT includes $n^3 \cdot 3$ entries, where n is the number of steps for each input channel of the LUT. In the example embodiment, the number of steps for each input channel of the LUT are the same. However, in other embodiments, the number of steps for each input channel can be different for each LUT. In the example embodiment, each entry is an 8-bit integer, but in other embodiments, each entry can be any other suitable data type, such as, for example, a 16-bit integer, a 16-bit half-precision floating point number, a 32-bit single precision floating point number, a 64-bit double precision floating point number, or the like.

The Stereoscopic Color Management Module includes Stereo Color Translation Engine 403, which uses source stereo color profile 401 to generate input transforms (e.g., 404 and 405), and rendering transform 407. Stereo Color Translation Engine 403 uses destination stereo color profile 402 to generate output transforms (e.g., 409 and 410), and rendering transform 408.

Source stereo color profile 401 includes information that indicates the number of views included in the stereoscopic image, the input transform LUTs (e.g. 404 and 405) for each view, and the LUT for rendering transform 407.

Destination stereo color profile 402 includes information that indicates the number of views included in the stereoscopic image, the output transform LUTs (e.g., 409 and 410) for each view, and the LUT for rendering transform 408.

Figure 5:
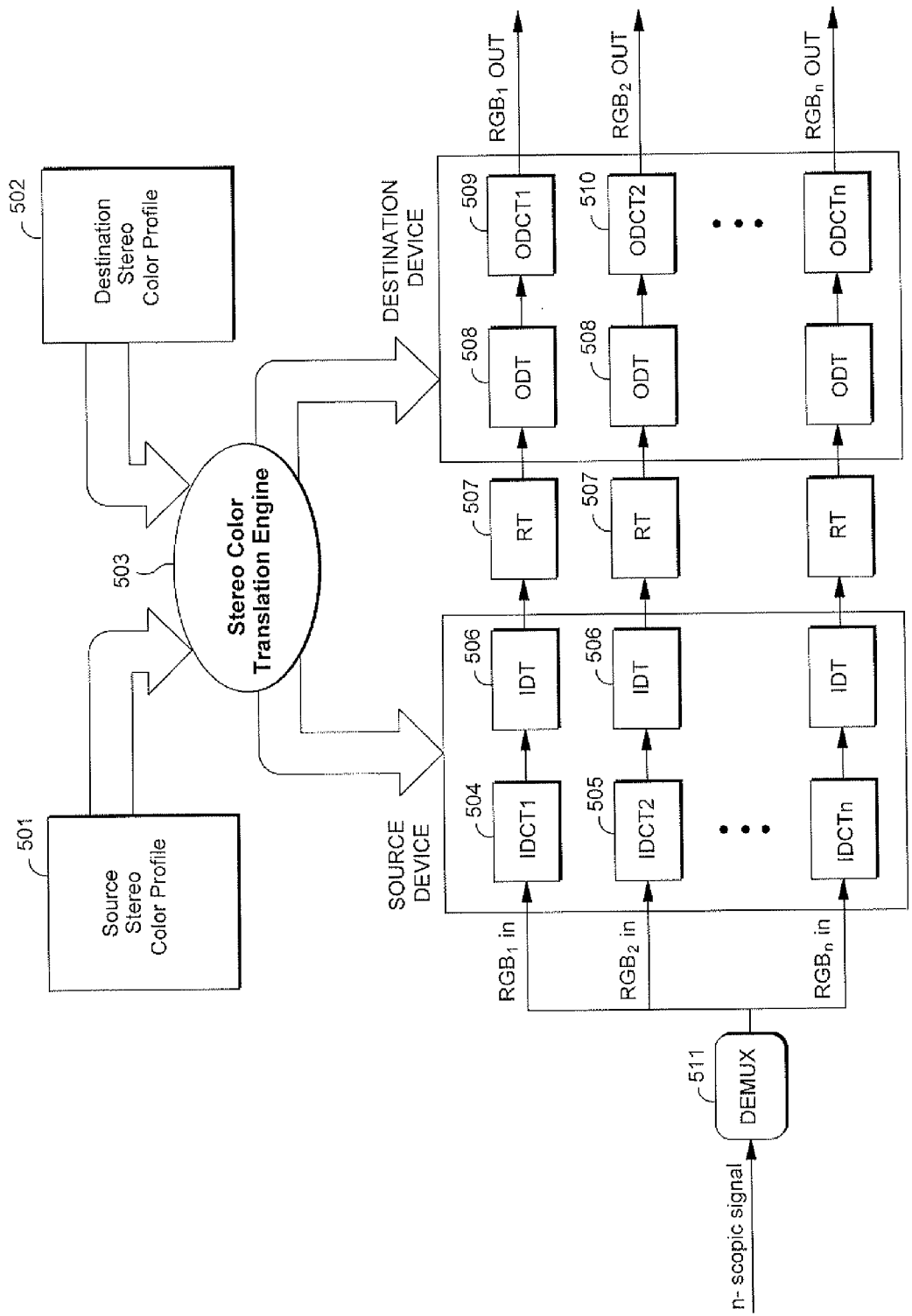
FIG. 5 is a representational view of stereoscopic color transform processing performed by a Stereoscopic Color Management Module in which the input transforms, the output transforms, and the rendering transform are defined by transform language based profiles, according to an example embodiment.

FIG. 5 is a representational view of stereoscopic color transform processing performed by a Stereoscopic Color Management Module in which the input transforms, the output transforms, and the rendering transform are defined by transform language based profiles.

In this embodiment illustrated in FIG. 5, the concept of "color profiles" is generalized or replaced by code modules. In this embodiment, a color profile contains executable code that implements a transform. In the example embodiment, the executable code is written in an interpreted language, such as, for example, the Color Transformation Language (CTL), in a compiled language such as, for example, C, or in any other suitable language. If a transform is primarily implemented as a LUT (as in the embodiment described with respect to FIG. 4), the transform may also be implemented in this embodiment simply as the LUT data together with the code that implements the look up or interpolation.

As shown in FIG. 5, the Stereoscopic Color Management Module includes Stereo Color Translation Engine 503 which retrieves input transforms (e.g., 504, 505), and intermediate input transform 506 from source stereo color profile 501. The input transforms are similar to input transforms 304 and 305 of FIG. 3.

The intermediate input transform 506 implements the transform from the nominal source color space to an intermediate color space that is independent of the source device, such as, for example, the ACES RGB color space.

Stereo Color Translation Engine 503 also retrieves output transforms (e.g., 509 and 510), and intermediate output transform 508 from the destination stereo color profile 502. The output transforms are similar to output transforms 310 and 311 of FIG. 3.

The intermediate output transform 508 implements the transform from the output color space of the rendering transform 507 to the nominal destination color space.

The rendering transform 507 is independent of the source and destination devices and implements a transform from the intermediate color space to an output color space. In the example embodiment, the intermediate color space is ACES RGB space, the rendering transform 507 is a Reference Rendering Transform (RRT) that emulates a "film look", and the output of the rendering transform 507 is in a CIEXYZ color space. In other embodiments, rendering transform 507 can be any other type of rendering transform, and the output of rendering transform 507 can be any other suitable type of output color space.

Together, intermediate input transform 506, rendering transform 507, and intermediate output transform 508 form a rendering transform from the nominal source color space to the nominal destination color space. Thus, together, transforms 506, 507 and 508 form a rendering transform that is similar to rendering transform 308 of FIG. 3.

As shown in FIG. 5, the stereoscopic image includes multiple views that are multiplexed in a known format, such as, for example, a temporal multiplexing format. Demultiplexer 511 decodes the multiplexed stereoscopic image stream from, for example, an image file (e.g., 138 of FIG. 2) to generate separate image data streams for each view. In the example embodiment, each view corresponds to an RGB input device color space. For purposes of illustration, FIG. 5 depicts transforms to process n such multiple views, where n can be 1, 2, 3, and so on.

Figure 6:
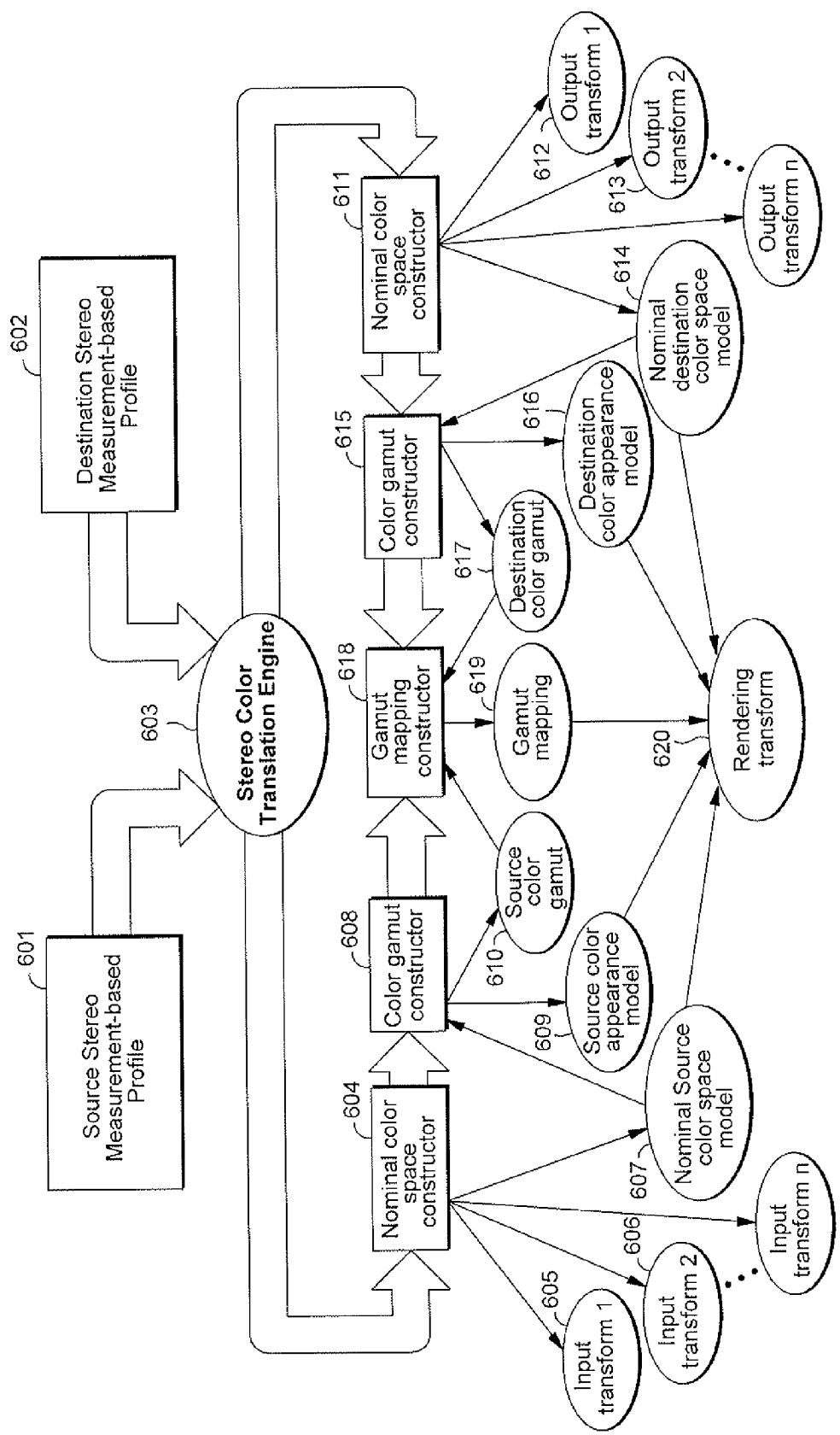
FIG. 6 is a representational view of stereoscopic color transform processing performed by a Stereoscopic Color Management Module in which the input transforms, the output transforms, and the rendering transform are defined by measurement-based profiles, according to an example embodiment.

FIG. 6 is a representational view of stereoscopic color transform processing performed by a Stereoscopic Color Management Module, in which the input transforms, the output transforms, and the rendering transform are defined by measurement-based profiles. Measurement-based profiles contain the raw measurement data, instead of "cooked" LUTs or computed parameters for the transform. Measurement-based profiles are used in, for example, Canon's Kyuanos color management system and Microsoft Windows Color System (WCS).

In order to perform the processing depicted in FIG. 3, the input transforms, rendering transform and the output transforms are constructed from the measurement data on the fly. For purposes of illustration, FIG. 6 depicts n input transforms and n output transforms indicate that the Stereoscopic Color Management Module is used for an image that has n views, where n can be 1, 2, 3, and so on.

Source Color Translation Engine 603 retrieves measurement data from the source stereo measurement-based profile 601 and invokes, first, the "nominal color space constructor" 604 to construct the input transforms (e.g., 605, 606) and the nominal source color space model 607 that is associated with the nominal source color space. Nominal source color space model 607 includes a forward transform from the nominal source color space to a device independent color space, such as, for example, CIEXYZ color space.

Next, the "color gamut constructor" 608 is invoked to construct the color appearance model 609 based on the source viewing condition and the source color gamut 610 (in the source color appearance space) for the nominal source color space. The color appearance model 609 includes a forward transform from the device independent color space to a color appearance space.

Analogously, Stereo Color Translation Engine 603 retrieves measurement data from the destination stereo measurement-based profile 602 and invokes, first, the "nominal color space constructor" 611 to construct the output transforms (e.g., 612 and 613) and the nominal destination color space model 614 that is associated with the nominal destination color space. Nominal source color space model 614 includes an inverse transform from a device independent color space, such as, for example, CIEXYZ color space, to the nominal destination color space.

Then, the "color gamut constructor" 615 is invoked to construct the color appearance model 616 based on the destination viewing conditions, and the destination color gamut 617 (in the destination color appearance space) for the nominal destination color space. The color appearance model 616 includes an inverse transform from a color appearance space to the device independent color space.

Finally, the "gamut mapping constructor" 618 is invoked to construct a gamut mapping 619 from the source color gamut 610 (in the source color appearance space) to the destination color gamut 617 (in the destination color appearance space).

A rendering transform 620 from the nominal source color space to the nominal destination color space is formed by concatenating the forward transform of nominal source color space model 607, the forward transform of the source color appearance model 609, the gamut mapping 619, the inverse transform of the destination color appearance model 616, and finally, the inverse transform of the nominal destination color space model 614.

In the example embodiment, source stereo measurement-based profile 601 is provided for a stereoscopic input device that includes multiple monoscopic imagers. Source stereo measurement-based profile 601 is obtained by measuring the response of each imager individually.

In the example embodiment, destination stereo measurement-based profile 602 is provided for a stereoscopic output device. Destination stereo measurement-based profile 602 is obtained by making measurements of each view of the stereoscopic output device.

Figure 7:
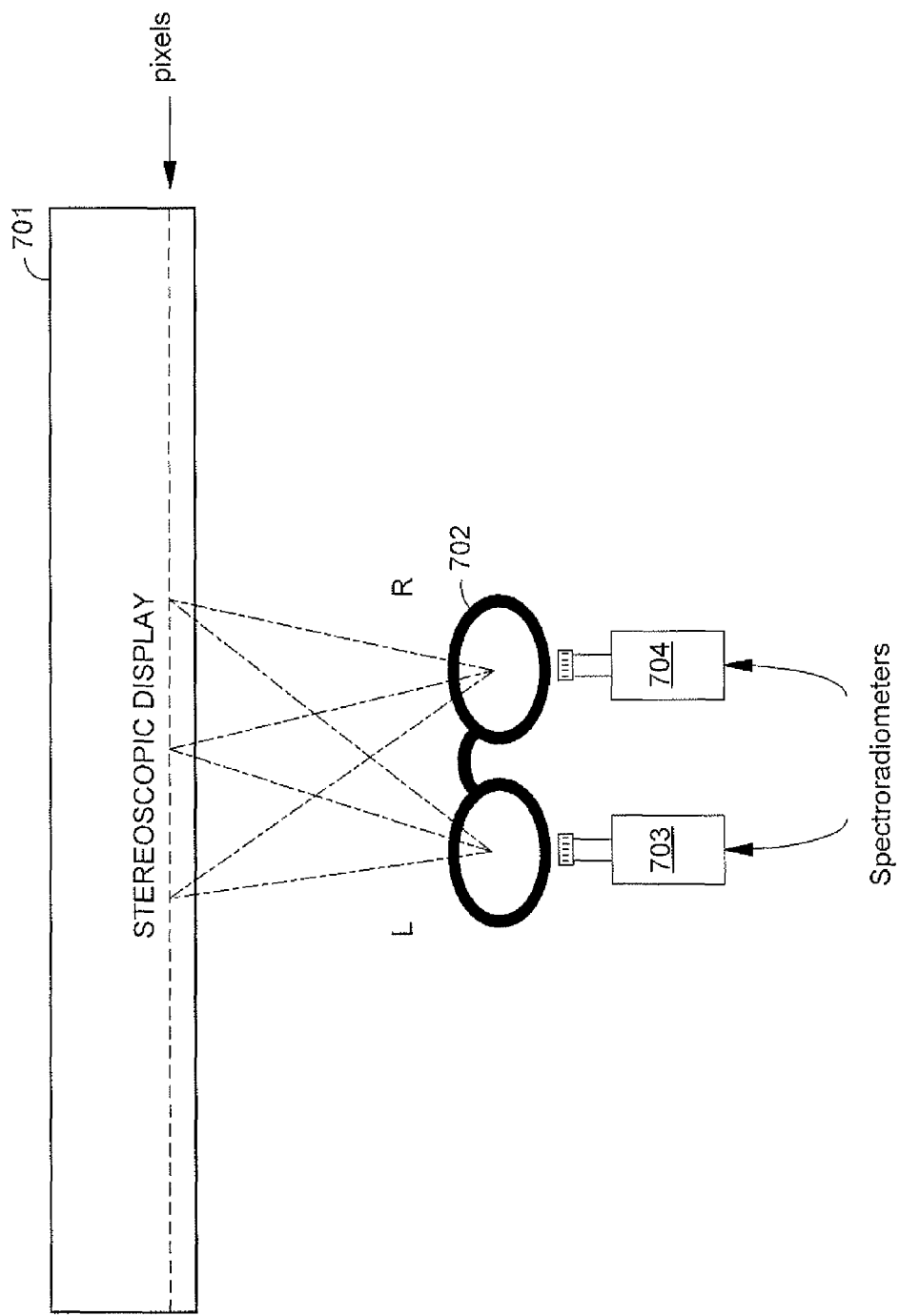
FIG. 7 is a diagram for explaining a method of measurement for a stereoscopic display.

FIG. 7 depicts the measuring of a stereoscopic display 701 that requires special eyewear for viewing. Measurement data for each view is obtained by measuring through each eye using a respective spectroradiometer (e.g., 703 and 704). In the example embodiment, the measurements are done simultaneously by two separate spectroradiometers. In other example embodiments, the measurements are done successively for each view by one spectroradiometer.

Figure 8:
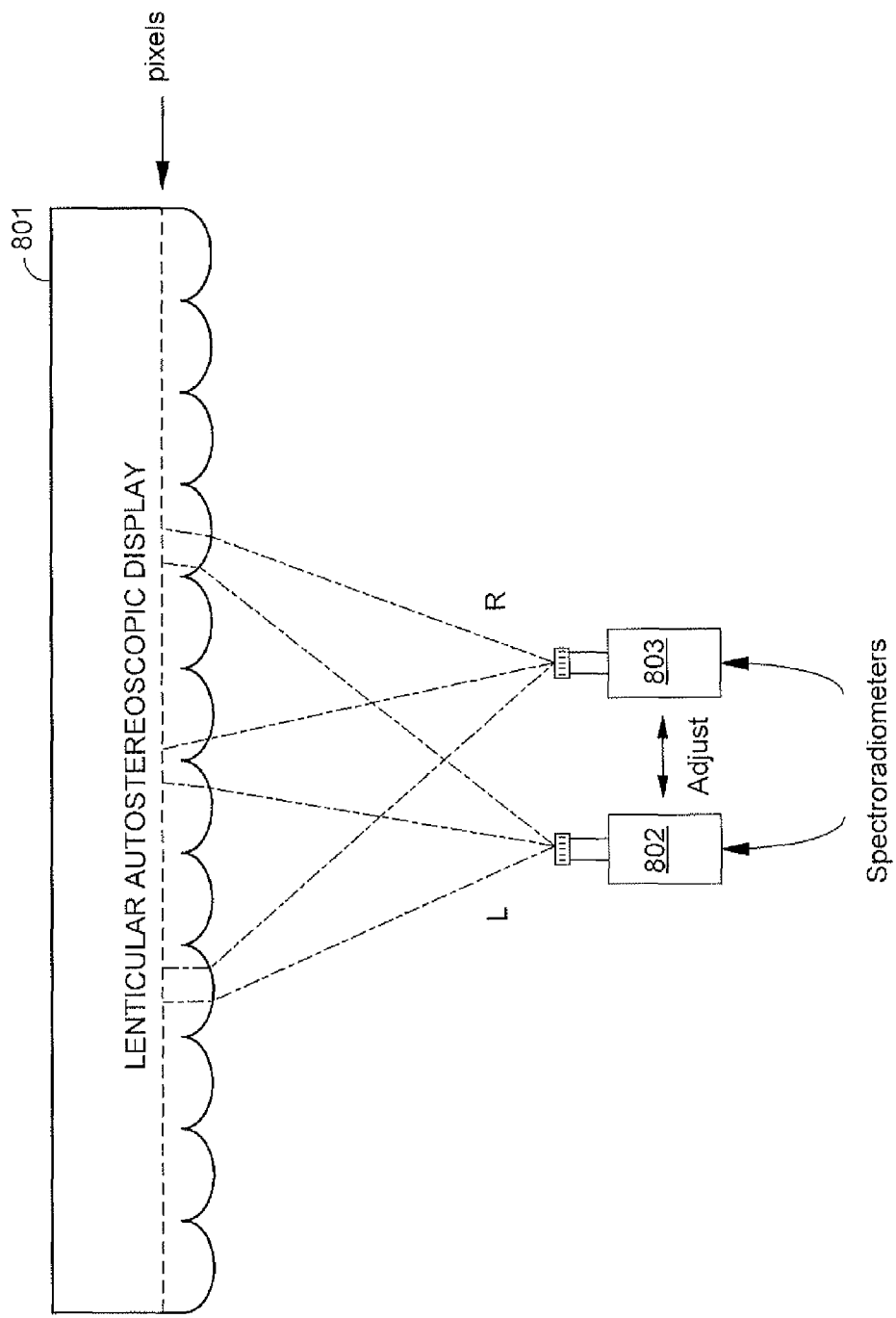
FIG. 8 is a diagram for explaining a method of measurement for an autostereoscopic display.

FIG. 8 depicts the measuring of an autostereoscopic display 801. The spectroradiometers 802 and 803 are positioned such that they measure each view separately. The relative position for each viewing location is adjusted to obtain the correct view. In the example embodiment, the measurements are done simultaneously by two separate spectroradiometers. In other example embodiments, the measurements are done successively for each view by one spectroradiometer.

Figure 9:
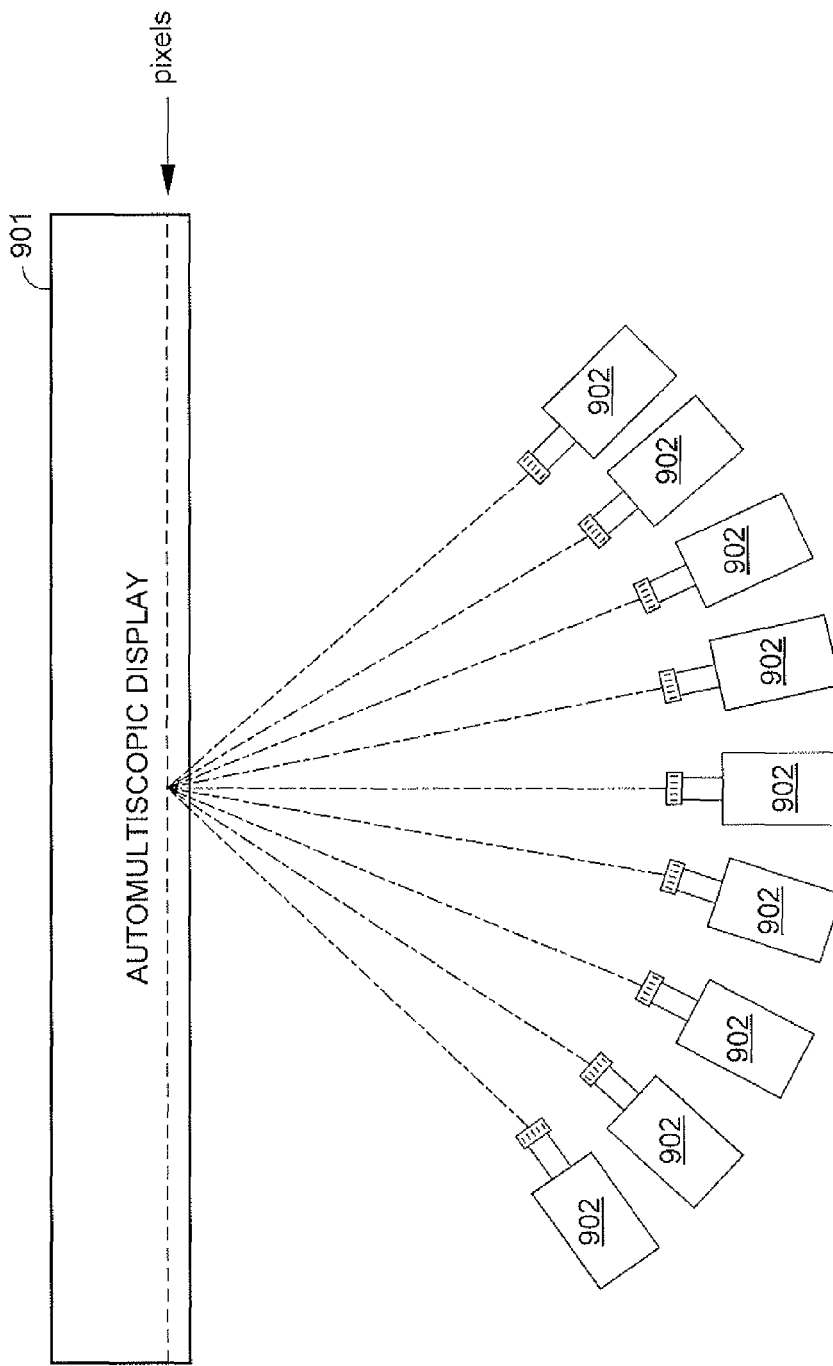
FIG. 9 is a diagram for explaining a method of measurement for an automultiscopic display.

FIG. 9 depicts the measuring of an automultiscopic display 901. In this case, one or more spectroradiometers (e.g., 902) are positioned at different viewing angles (nine are shown in the figure) in order to measure each view.

Figure 10:
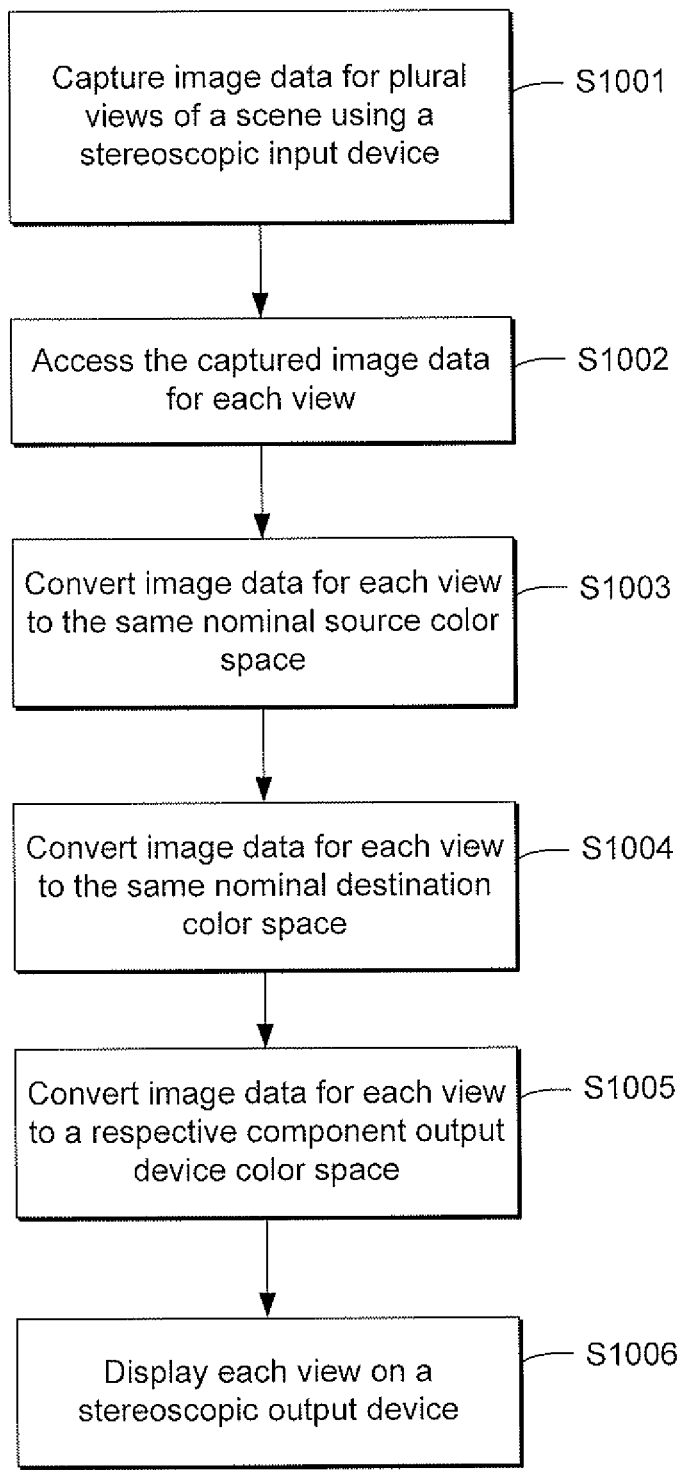
FIG. 10 is a flow diagram for explaining stereoscopic color processing performed by a Stereoscopic Color Management Module, according to an example embodiment.

FIG. 10 is a flow diagram for explaining stereoscopic color processing performed by a Stereoscopic Color Management Module, such as, for example, SCMM 135 of FIG. 2. At step S1001, stereoscopic image data is captured by a stereoscopic input device (e.g., stereoscopic digital color camera 60 of FIG. 1) to media such as, for example, image files 138 of FIG. 2. Image data for each view is defined in a corresponding component input device color space.

At step S1002, the stereoscopic image data is accessed by the SCMM so that it can be processed for display on a stereoscopic output device (e.g., stereoscopic color monitor 43 of FIG. 1).

At step S1003, the SCMM converts the accessed stereoscopic image data (which is in the component input device color spaces) to a nominal source color space, using plural input transforms each corresponding to one of the plural views. Each input transform converts from a respective component input device color space to the same nominal source color space.

At step S1004, the SCMM uses a rendering transform to convert image data for each view in the nominal source color space to a nominal destination color space. The nominal source color space, nominal destination color space and rendering transform are the same for all views.

At step S1005, the SCMM converts image data for each view in the nominal destination color space to a respective one of plural component output device color spaces, using a respective one of plural output transforms. The plural component output device color spaces are associated with the stereoscopic output device, and each component output device color space corresponds to one of the plural views. Each output transform converts from the nominal destination color space to a respective destination device color space corresponding to a respective view. At step S1006, each view is displayed on the stereoscopic output device.

Figure 11:
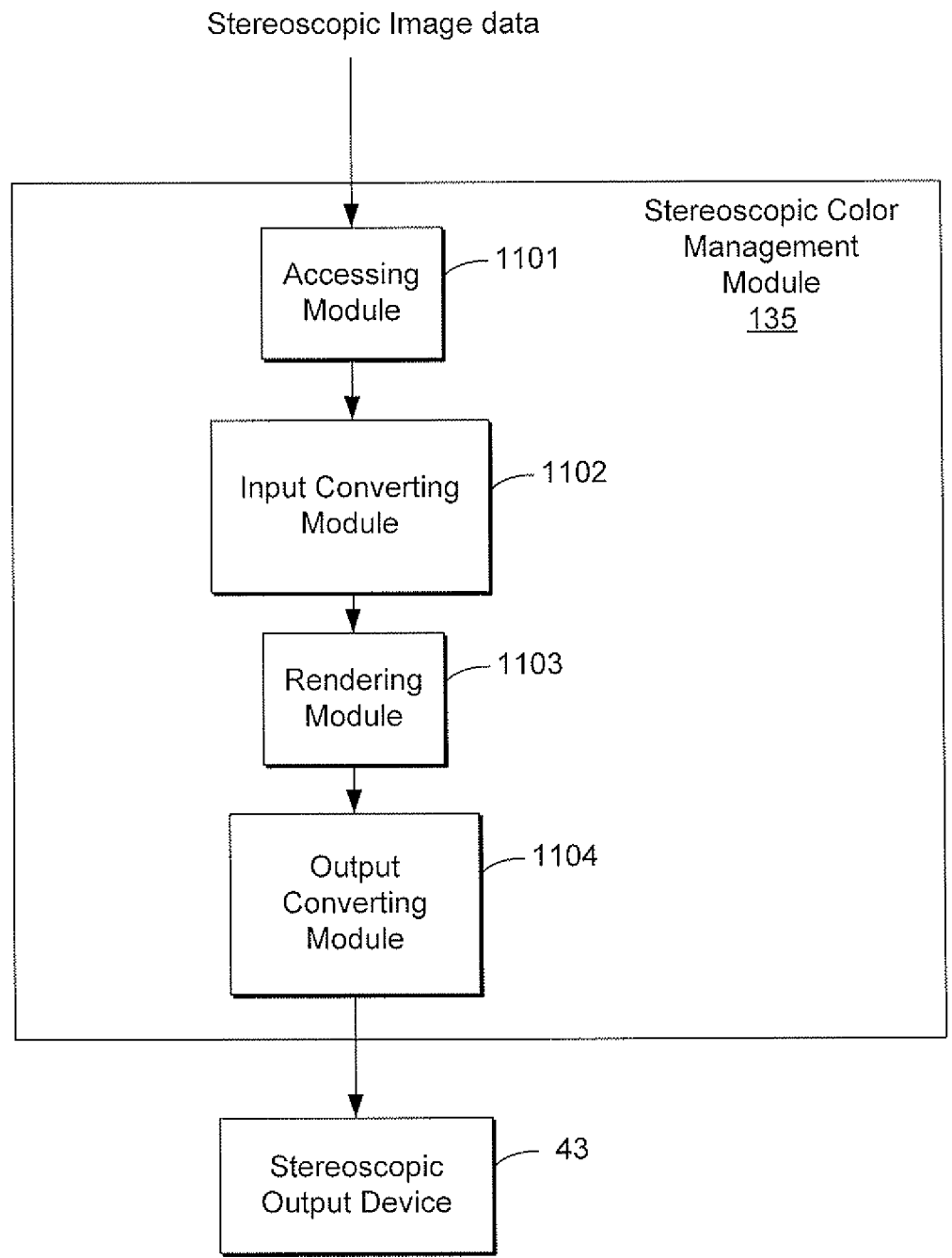
FIG. 11 is a module diagram for explaining stereoscopic color processing performed by a Stereoscopic Color Management Module, according to an example embodiment.

FIG. 11 is a module diagram for explaining stereoscopic color processing performed by a Stereoscopic Color Management Module, such as, for example, SCMM 135 of FIG. 2. In the example embodiment depicted in FIG. 11, the SCMM has an accessing module 1101, an input converting module 1102, a rendering module 1103, and an output converting module, 1104.

Accessing module 1101 accesses stereoscopic image data captured by a stereoscopic input device (e.g., stereoscopic digital color camera 60 of FIG. 1), and provides the accessed image data to input converting module 1102.

Input converting module 1102 converts the accessed stereoscopic image data (which is in the component input device color spaces) to a nominal source color space, using plural input transforms each corresponding to one of the plural views. Each input transform converts from a respective component input device color space to the same nominal source color space.

Rendering module 1103 receives the stereoscopic image data (which is in the nominal source color space) from input converting module 1102. Rendering module 1103 includes a rendering transform. The rendering transform converts image data for each view in the nominal source color space to a nominal destination color space. The nominal source color space, nominal destination color space and rendering transform are the same for all views.

Output converting module 1104 converts image data for each view in the nominal destination color space to a respective one of plural component output device color spaces, using a respective one of plural output transforms. The plural component output device color spaces are associated with the stereoscopic output device, and each component output device color space corresponds to one of the plural views. Each output transform converts from the nominal destination color space to a respective destination device color space corresponding to a respective view. Output converting module 1104 sends the converted image data in respective component output device color spaces to a stereoscopic output device that displays the image data.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A stereoscopic color management method comprising:
   accessing image data for plural views of a scene, wherein each of the plural views corresponds to a different one of plural parallax views, wherein the image data is captured by a stereoscopic input device, wherein plural component input device color spaces each corresponding to one of the plural views are associated with the stereoscopic input device, and wherein the image data for each view is defined in the corresponding component input device color space;

converting image data in the component input device color spaces to a nominal source color space using plural input transforms, wherein each of the plural input transforms corresponds to one of the plural views, and wherein each input transform converts from the respective component input device color space corresponding to the respective view to the same nominal source color space;

using a rendering transform to convert image data for each view in the nominal source color space to a nominal destination color space, wherein the nominal source color space, nominal destination color space and rendering transform are the same for all views; and converting image data for each view in the nominal destination color space to a respective one of plural component output device color spaces using a respective one of plural output transforms, wherein the plural component output device color spaces each corresponding to one of the plural views are associated with a stereoscopic output device, wherein each of the plural output transforms corresponds to one of the plural views, and wherein each output transform converts from the nominal destination color space to the component output device color space corresponding to the respective view.

2. The stereoscopic color management method of claim 1, wherein there are two views of the scene.

3. The stereoscopic color management method of claim 1, wherein the stereoscopic input device comprises plural monoscopic input devices, wherein each monoscopic input device corresponds to one of the plural views and the respective component input device color space.

4. The stereoscopic color management method of claim 3, wherein each one of the plural input transforms is defined by a respective one of the monoscopic input devices.

5. The stereoscopic color management method of claim 3, wherein each monoscopic input device is a camera, and the nominal source color space is an RGB space of a predetermined one of the cameras.

6. The stereoscopic color management method of claim 1, wherein the nominal source color space is a virtual device color space.

7. The stereoscopic color management method of claim 1, wherein the stereoscopic output device comprises plural monoscopic output devices, wherein each monoscopic output device corresponds to one of the plural views and the respective component output device color space.

8. The stereoscopic color management method of claim 7, wherein each one of the plural output transforms is defined by a respective one of the monoscopic output devices.

9. The stereoscopic color management method of claim 1, wherein the stereoscopic output device is a stereoscopic display.

10. The stereoscopic color management method of claim 1, wherein the stereoscopic output device is an autostereoscopic display.

11. The stereoscopic color management method of claim 1, wherein the image data includes still images.

12. The stereoscopic color management method of claim 1, wherein the image data includes moving images.

13. The stereoscopic color management method of claim 1, wherein the rendering transform comprises a first transform from the nominal source color space to a profile connection space, and a second transform from the profile connection space to the nominal destination color space.

14. The stereoscopic color management method of claim 13, wherein the first and second transforms each implement a rendering intent.

15. The stereoscopic color management method of claim 1, wherein at least one of the input transforms, the output transforms, and the rendering transform is defined by LUT-based profiles.

16. The stereoscopic color management method of claim 1, wherein at least one of the input transforms, the output transforms, and the rendering transform is defined by transform language based profiles.

17. The stereoscopic color management method of claim 1, wherein at least one of the input transforms, the output transforms, and the rendering transform is defined by measurement-based profiles.

18. A stereoscopic color management module comprising:

an accessing module constructed to access image data for plural views of a scene, wherein each of the plural views corresponds to a different one of plural parallax views, wherein the image data is captured by a stereoscopic input device, wherein plural component input device color spaces each corresponding to one of the plural views are associated with the stereoscopic input device, and wherein the image data for each view is defined in the corresponding component input device color space;

an input converting module constructed to convert image data in the component input device color spaces to a nominal source color space using plural input transforms, wherein each of the plural input transforms corresponds to one of the plural views, and wherein each input transform converts the respective component input device color space corresponding to the respective view to the same nominal source color space;

a rendering module constructed to use a rendering transform to convert image data in the nominal source color space to a nominal destination color space, wherein the nominal source color space, nominal destination color space and rendering transform are the same for all views; and an output converting module constructed to convert image data for each view in the nominal destination color space to a respective one of plural component output device color spaces using a respective one of plural output transforms, wherein the plural component output device color spaces each corresponding to one of the plural views are associated with a stereoscopic output device, wherein each of the plural output transforms corresponds to one of the plural views, and wherein each output transform converts from the nominal destination color space to the component output device color space corresponding to the respective view.

19. The stereoscopic color management module of claim 18, wherein there are two views of the scene.

20. The stereoscopic color management module of claim 18, wherein the stereoscopic input device comprises plural monoscopic input devices, wherein each monoscopic input device corresponds to one of the plural views and the respective component input device color space.

21. The stereoscopic color management module of claim 20, wherein each one of the plural input transforms is defined by a respective one of the monoscopic input devices.

22. The stereoscopic color management module of claim 20, wherein each monoscopic input device is a camera, and the nominal source color space is an RGB space of a predetermined one of the cameras.

23. The stereoscopic color management module of claim 18, wherein the nominal source color space is a virtual device color space.

24. The stereoscopic color management module of claim 18, wherein the stereoscopic output device comprises plural monoscopic output devices, wherein each monoscopic output device corresponds to one of the plural views and the respective component output device color space.

25. The stereoscopic color management module of claim 24, wherein each one of the plural output transforms is defined by a respective one of the monoscopic output devices.

26. The stereoscopic color management module of claim 18, wherein the stereoscopic output device is a stereoscopic display.

27. The stereoscopic color management module of claim 18, wherein the stereoscopic output device is an autostereoscopic display.

28. The stereoscopic color management module of claim 18, wherein the image data includes still images.

29. The stereoscopic color management module of claim 18, wherein the image data includes moving images.

30. The stereoscopic color management module of claim 18, wherein the rendering transform comprises a first transform from the nominal source color space to a profile connection space, and a second transform from the profile connection space to the nominal destination color space.

31. The stereoscopic color management module of claim 30, wherein the first and second transforms each implement a rendering intent.

32. The stereoscopic color management module of claim 18, wherein at least one of the input transforms, the output transforms, and the rendering transform is defined by LUT-based profiles.

33. The stereoscopic color management module of claim 18, wherein at least one of the input transforms, the output transforms, and the rendering transform is defined by transform language based profiles.

34. The stereoscopic color management module of claim 18, wherein at least one of the input transforms, the output transforms, and the rendering transform is defined by measurement-based profiles.

35. A stereoscopic color management apparatus comprising:
a computer-readable memory constructed to store computer-executable process steps; and
a processor constructed to execute the computer-executable process steps stored in the memory;
wherein the process steps stored in the memory cause the processor to perform a stereoscopic color management method, and include computer-executable process steps to:
access image data for plural views of a scene, wherein each of the plural views corresponds to a different one of plural parallax views, wherein the image data is captured by a stereoscopic input device, wherein plural component input device color spaces each corresponding to one of the plural views are associated with the stereoscopic input device, and wherein the image data for each view is defined in the corresponding component input device color space;
convert image data in the component input device color spaces to a nominal source color space using plural input transforms, wherein each of the plural input transforms corresponds to one of the plural views, wherein each input transform converts from the respective component input device color space corresponding to the respective view to the same nominal source color space;
use a rendering transform to convert image data for each view in the nominal source color space to a nominal destination color space, wherein the nominal source color space, nominal destination color space and rendering transform are the same for all views; and
convert image data for each view in the nominal destination color space to a respective one of plural component output device color spaces using a respective one of plural output transforms, wherein the plural component output device color spaces each corresponding to one of the plural views are associated with a stereoscopic output device, wherein each of the plural output transforms corresponds to one of the plural views, and wherein each output transform converts from the nominal destination color space to the component output device color space corresponding to the respective view.

36. The stereoscopic color management apparatus of claim 35, wherein there are two views of the scene.

37. The stereoscopic color management apparatus of claim 35, wherein the stereoscopic input device comprises plural monoscopic input devices, wherein each monoscopic input device corresponds to one of the plural views and the respective component input device color space.

38. The stereoscopic color management apparatus of claim 37, wherein each one of the plural input transforms is defined by a respective one of the monoscopic input devices.

39. The stereoscopic color management apparatus of claim 37, wherein each monoscopic input device is a camera, and the nominal source color space is an RGB space of a predetermined one of the cameras.

40. The stereoscopic color management apparatus of claim 35, wherein the nominal source color space is a virtual device color space.

41. The stereoscopic color management apparatus of claim 35, wherein the stereoscopic output device comprises plural monoscopic output devices, wherein each monoscopic output device corresponds to one of the plural views and the respective component output device color space.

42. The stereoscopic color management apparatus of claim 41, wherein each one of the plural output transforms is defined by a respective one of the monoscopic output devices.

43. The stereoscopic color management apparatus of claim 35, wherein the stereoscopic output device is a stereoscopic display.

44. The stereoscopic color management apparatus of claim 35, wherein the stereoscopic output device is an autostereoscopic display.

45. The stereoscopic color management apparatus of claim 35, wherein the image data includes still images.

46. The stereoscopic color management apparatus of claim 35, wherein the image data includes moving images.

47. The stereoscopic color management apparatus of claim 35, wherein the rendering transform comprises a first transform from the nominal source color space to a profile connection space, and a second transform from the profile connection space to the nominal destination color space.

48. The stereoscopic color management apparatus of claim 47, wherein the first and second transforms each implement a rendering intent.

49. The stereoscopic color management apparatus of claim 35, wherein at least one of the input transforms, the output transforms, and the rendering transform is defined by LUT-based profiles.

50. The stereoscopic color management apparatus of claim 35, wherein at least one of the input transforms, the output transforms, and the rendering transform is defined by transform language based profiles.

51. The stereoscopic color management apparatus of claim 35, wherein at least one of the input transforms, the output transforms, and the rendering transform is defined by measurement-based profiles.

52. A computer-readable memory medium on which is stored computer-executable process steps for causing a computer to perform a stereoscopic color management method, said process steps comprising:

accessing image data for plural views of a scene, wherein each of the plural views corresponds to a different one of plural parallax views, wherein the image data is captured by a stereoscopic input device, wherein plural component input device color spaces each corresponding to one of the plural views are associated with the stereoscopic input device, and wherein the image data for each view is defined in the corresponding component input device color space;

converting image data in the component input device color spaces to a nominal source color space using plural input transforms, wherein each of the plural input transforms corresponds to one of the plural views, and wherein each input transform converts from the respective component input device color space corresponding to the respective view to the same nominal source color space;

using a rendering transform to convert image data for each view in the nominal source color space to a nominal destination color space, wherein the nominal source color space, nominal destination color space and rendering transform are the same for all views; and converting image data in each view in the nominal destination color space to a respective one of plural component output device color spaces using a respective one of plural output transforms, wherein the plural component output device color spaces each corresponding to one of the plural views are associated with a stereoscopic output device, wherein each of the plural output transforms corresponds to one of the plural views, and wherein each output transform converts from the nominal destination color space to the component output device color space corresponding to the respective view.

53. The computer-readable memory medium of claim 52, wherein there are two views of the scene.

54. The computer-readable memory medium of claim 52, wherein the stereoscopic input device comprises plural monoscopic input devices, wherein each monoscopic input device corresponds to one of the plural views and the respective component input device color space.

55. The computer-readable memory medium of claim 54, wherein each one of the plural input transforms is defined by a respective one of the monoscopic input devices.

56. The computer-readable memory medium of claim 54, wherein each monoscopic input device is a camera, and the nominal source color space is an RGB space of a predetermined one of the cameras.

57. The computer-readable memory medium of claim 52, wherein the nominal source color space is a virtual device color space.

58. The computer-readable memory medium of claim 52, wherein the stereoscopic output device comprises plural monoscopic output devices, wherein each monoscopic output device corresponds to one of the plural views and the respective component output device color space.

59. The computer-readable memory medium of claim 58, wherein each one of the plural output transforms is defined by a respective one of the monoscopic output devices.

60. The computer-readable memory medium of claim 52, wherein the stereoscopic output device is a stereoscopic display.

61. The computer-readable memory medium of claim 52, wherein the stereoscopic output device is an autostereoscopic display.

62. The computer-readable memory medium of claim 52, wherein the image data includes still images.

63. The computer-readable memory medium of claim 52, wherein the image data includes moving images.

64. The computer-readable memory medium of claim 52, wherein the rendering transform comprises a first transform from the nominal source color space to a profile connection space, and a second transform from the profile connection space to the nominal destination color space.

65. The computer-readable memory medium of claim 64, wherein the first and second transforms each implement a rendering intent.

66. The computer-readable memory medium of claim 52, wherein at least one of the input transforms, the output transforms, and the rendering transform is defined by LUT-based profiles.

67. The computer-readable memory medium of claim 52, wherein at least one of the input transforms, the output transforms, and the rendering transform is defined by transform language based profiles.

68. The computer-readable memory medium of claim 52, wherein at least one of the input transforms, the output transforms, and the rendering transform is defined by measurement-based profiles.

* * * * *